(12) United States Patent
Ito et al.

(10) Patent No.: US 7,944,594 B2
(45) Date of Patent: May 17, 2011

(54) IMAGE PROCESSING DEVICE AND AN IMAGE PROCESSING METHOD FOR CURBING THE AMOUNT OF COLOR MATERIAL CONSUMED AND SUPPRESSING A DETERIORATION IN IMAGE QUALITY

(75) Inventors: Akihiro Ito, Ebina (JP); Noriko Hasegawa, Ebina (JP); Yasunari Kishimoto, Ashigarakami-gun (JP); Yasuki Yamauchi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 526 days.

(21) Appl. No.: 11/648,565

(22) Filed: Jan. 3, 2007

(65) Prior Publication Data

US 2007/0279658 A1 Dec. 6, 2007

(30) Foreign Application Priority Data

May 31, 2006 (JP) ................................. 2006-152520

(51) Int. Cl.
*G03F 3/08* (2006.01)
*G06K 15/00* (2006.01)
*H04N 1/40* (2006.01)
*G06F 3/12* (2006.01)

(52) U.S. Cl. ........ 358/518; 358/519; 358/520; 358/521; 358/523; 358/2.1; 358/3.24; 358/1.13

(58) Field of Classification Search .................. 358/518, 358/519, 520, 521, 523, 2.1, 3.24, 1.13, 3.23; 347/131; 399/138
See application file for complete search history.

(56) References Cited

U.S. PATENT DOCUMENTS

| | | | | | |
|---|---|---|---|---|---|
| 5,751,433 | A | * | 5/1998 | Narendranath et al. | 358/1.9 |
| 5,751,434 | A | * | 5/1998 | Narendranath et al. | 358/1.9 |
| 5,841,951 | A | * | 11/1998 | Shu et al. | 358/1.9 |
| 6,816,179 | B2 | * | 11/2004 | Hanyu | 347/131 |
| 7,239,425 | B2 | * | 7/2007 | Namikata | 358/2.1 |
| 7,298,522 | B2 | * | 11/2007 | Sugimoto | 358/1.3 |

(Continued)

FOREIGN PATENT DOCUMENTS

JP A 9-244475 9/1997

(Continued)

OTHER PUBLICATIONS

Office Action issued in JP Application No. 2006-152520 on Jul. 6, 2010 (with English translation).

*Primary Examiner* — King Y Poon
*Assistant Examiner* — Vincent R Peren
(74) *Attorney, Agent, or Firm* — Oliff & Berridge, PLC

(57) ABSTRACT

An image forming device that carries out color reproduction using plural of color materials having: a setting unit setting a color material curbing mode that curbs an amount of color material; and a color information inputting unit that inputs input color information. The image forming device further has a converting unit that, when the color material curbing mode is set by the setting unit, converts the input color information inputted by the color information inputting unit into output color information in a color material curbing region, on the basis of correspondence relationships that are set in advance such that a region that is color-reproducible by the image forming device is kept within the color material curbing region that is narrowed such that an amount of the color material is curbed.

23 Claims, 11 Drawing Sheets

U.S. PATENT DOCUMENTS

| | | |
|---|---|---|
| 7,398,029 B2 * | 7/2008 | Jacobsen et al. ............... 399/79 |
| 2002/0060797 A1 * | 5/2002 | Namikata ...................... 358/1.9 |
| 2003/0043392 A1 * | 3/2003 | Sugimoto ..................... 358/1.9 |
| 2004/0051886 A1 | 3/2004 | Sasaki et al. |
| 2004/0145757 A1 * | 7/2004 | Marsden et al. ............... 358/1.9 |
| 2004/0223174 A1 * | 11/2004 | Mikami ........................ 358/1.9 |
| 2005/0062992 A1 | 3/2005 | Kishimoto et al. |
| 2006/0056683 A1 * | 3/2006 | Komatsu ...................... 382/162 |

FOREIGN PATENT DOCUMENTS

| | | |
|---|---|---|
| JP | A 2003-66781 | 3/2003 |
| JP | 2004-112269 A | 4/2004 |
| JP | 2004-147257 A | 5/2004 |
| JP | 2004-243559 A | 9/2004 |
| JP | 2005-063093 A | 3/2005 |
| JP | A 2005-86289 | 3/2005 |

* cited by examiner

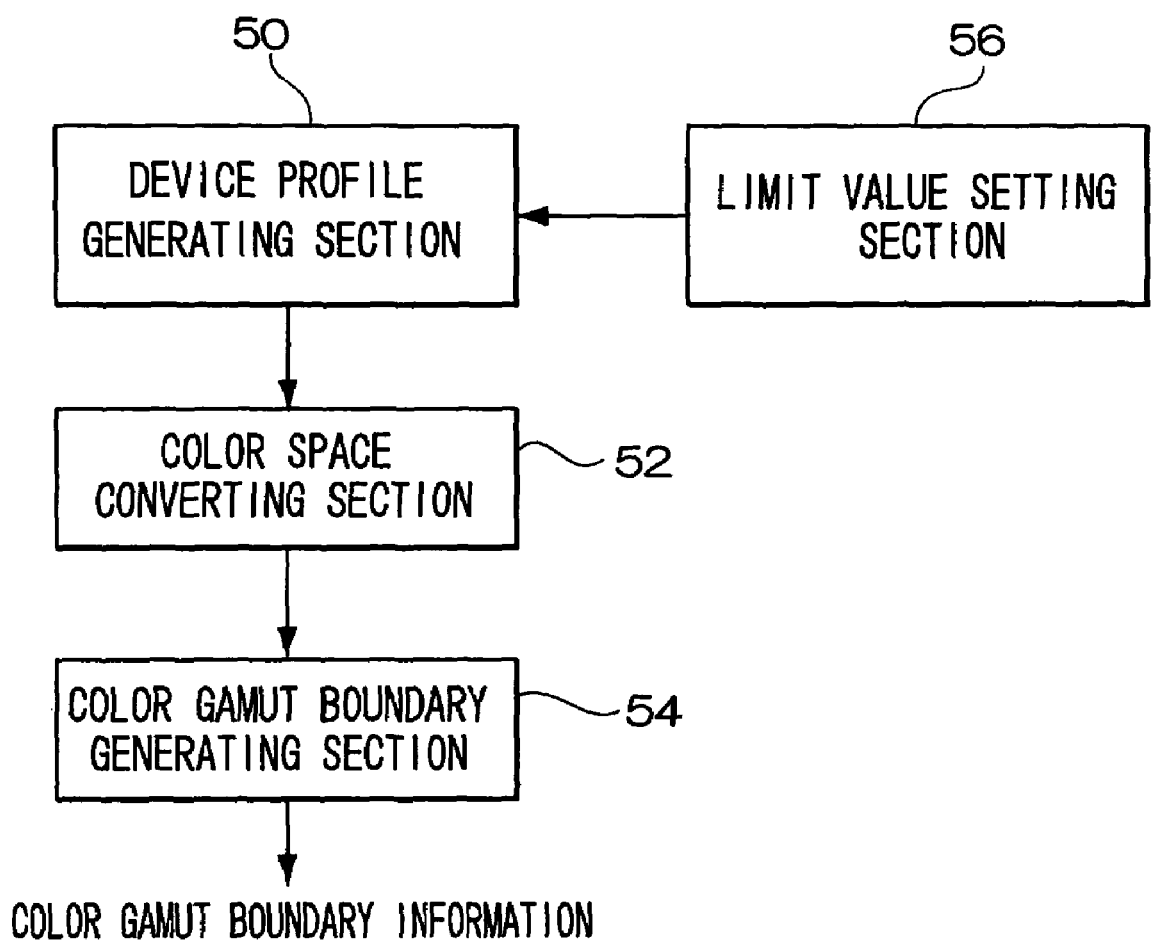
F I G. 3

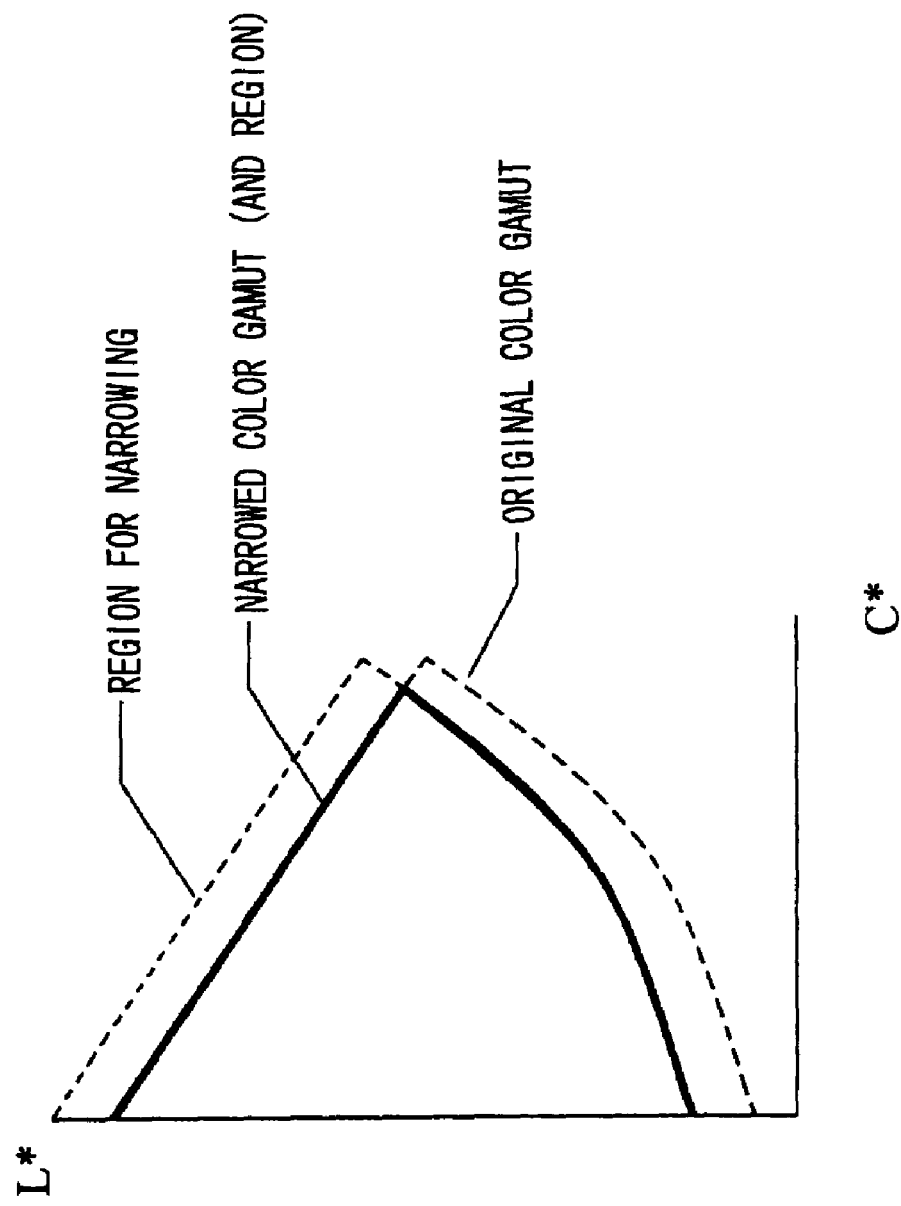

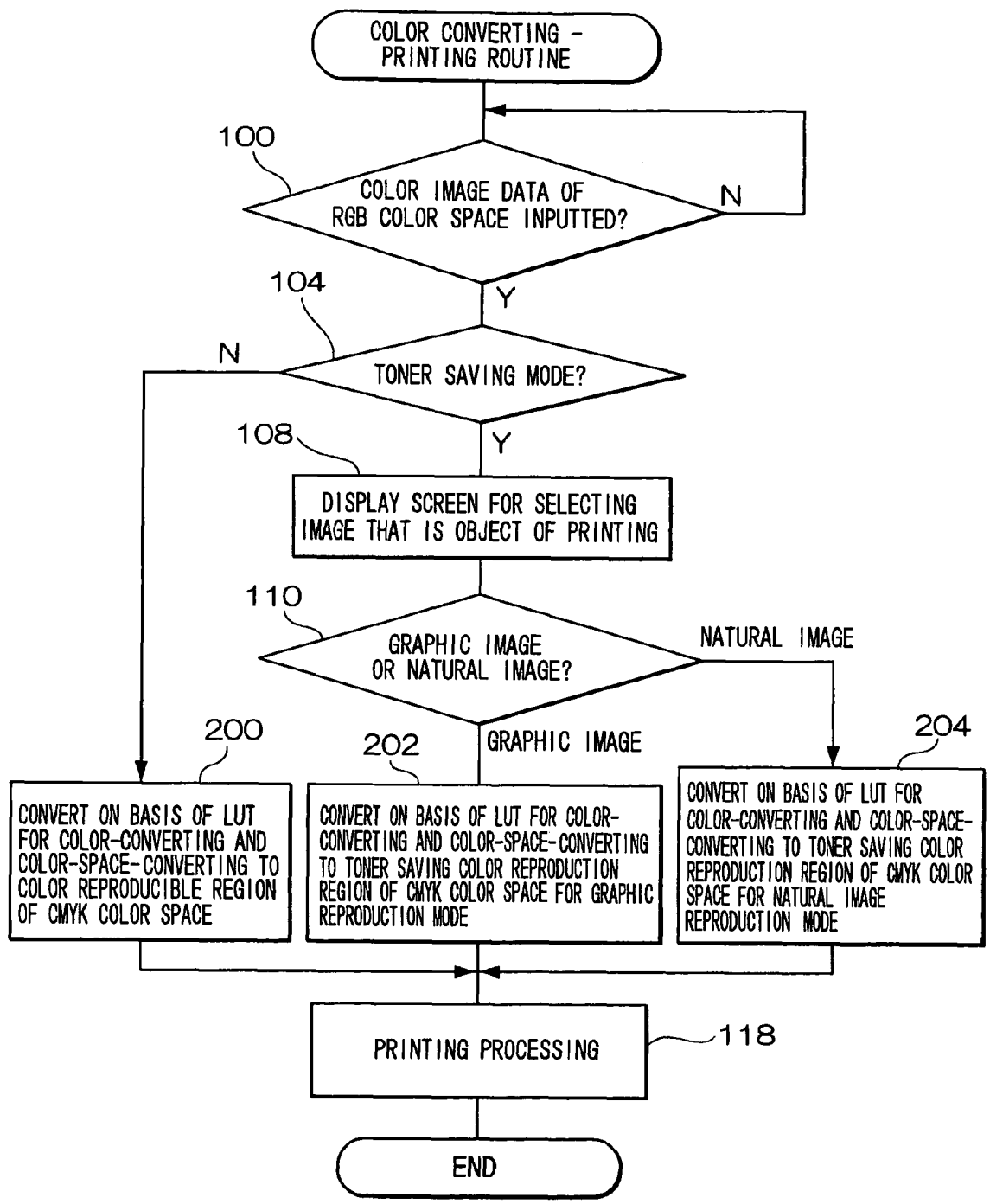

IMAGE PROCESSING DEVICE AND AN IMAGE PROCESSING METHOD FOR CURBING THE AMOUNT OF COLOR MATERIAL CONSUMED AND SUPPRESSING A DETERIORATION IN IMAGE QUALITY

BACKGROUND OF THE INVENTION

1. Technical Field

The present invention relates to an image processing device and an image processing method, and in particular, to an image processing device and an image processing method having a mode which curbs the amount of color material which is consumed.

2. Related Art

A conventional image processing device such as a printer or the like forms an image on a recording sheet by using a color material such as toner or the like.

Toner saving modes and the like are provided in order to curb the amount of toner which is consumed, and the user utilizes such a mode when he/she wishes to reduce printing costs. An image outputting device which reduces the amount of toner which is used by lowering the density by using a γ conversion table, and a color printer which reduces the amount of toner which is used by using a profile which increases the brightness, are known as techniques which curb the amount of toner which is consumed.

There is also known a color image processing device which, by lowering the chroma without substantially changing the hue, keeps the deterioration in color reproducibility to a minimum and curbs the amount of the recording material which is used.

However, the aforementioned image outputting device has the problem that it cannot be utilized in usual applications because changes in the color tint of intermediate colors arise, the reproduced image also becomes more pale overall, and the impression greatly varies from that of the color reproduction of a reproduced image in the usual mode. Further, the aforementioned color printer and color image processing device have the problem that the reproduced image gives an impression of being more pale.

SUMMARY

The present invention provides an image processing device and an image processing method which curb the amount of color material which is consumed and can suppress a deterioration in image quality.

A first aspect of the present invention provides an image processing device having: a setting unit setting a color material curbing mode that curbs an amount of color material in an image forming device that carries out color reproduction using plural color materials; a color information inputting unit that inputs input color information; and a converting unit that, when the color material curbing mode is set by the setting unit, converts the input color information inputted by the color information inputting unit into output color information in a color material curbing region on the basis of correspondence relationships which are set in advance such that a region that is color-reproducible by the image forming device is kept within the color material curbing region that is narrowed such that an amount of the color material is curbed.

Other aspects, features and advantages of the present invention will become apparent from the following description taken in conjunction with the accompanying drawings.

BRIEF DESCRIPTION OF THE DRAWINGS

Exemplary embodiments of the present invention will be described in detail based on the following FIGures, in which:

FIG. 3 is a block diagram showing the state of a color gamut boundary generating method for limiting each toner amount, relating to the first exemplary embodiment of the present invention;

FIG. 10 is an explanatory diagram showing yet another example of the relationship between a usual color gamut boundary and a narrowed color gamut boundary in the CIELAB color space; and FIG. 11 is a flowchart showing the contents of a color converting—printing processing routine of a printer relating to a fifth exemplary embodiment of the present invention.

DETAILED DESCRIPTION

Exemplary embodiments of the present invention will be described hereinafter with reference to drawings. Note that, in the present exemplary embodiments, cases are described in which the present invention is applied to a printer.

Figure 1:
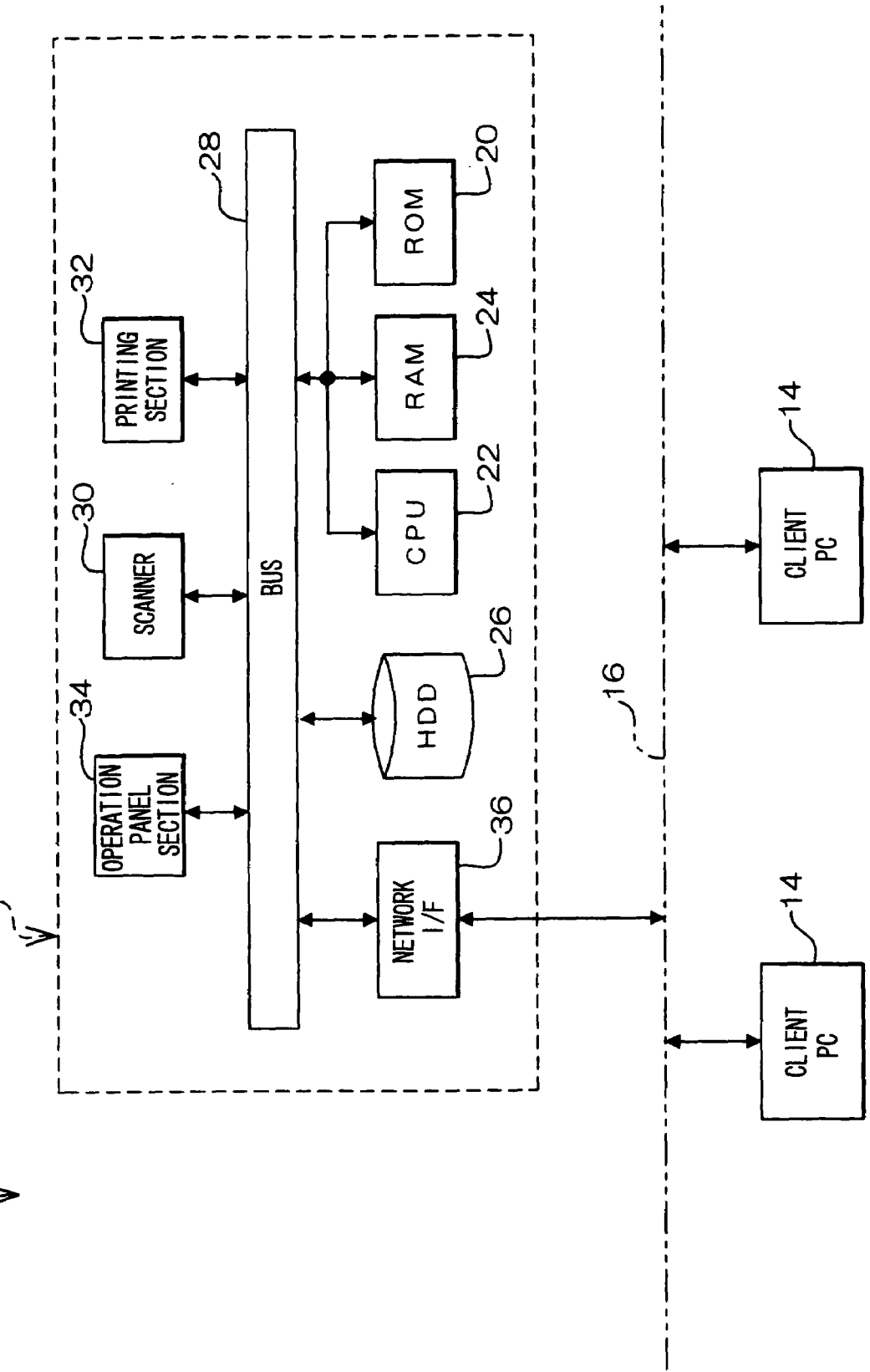
FIG. 1 is a schematic diagram showing the structure of an image processing system relating to a first exemplary embodiment of the present invention.

As shown in FIG. 1, an image processing system 10 relating to a first exemplary embodiment of the present invention is structured by a printer 12, client PCs 14, and a network 16 such as a LAN (local area network) or the like. The printer 12 and the client PCs 14 are connected together via the network 16.

Further, the printer 12 has: a ROM 20 in which various types of programs, parameters, and the like are stored; a CPU 22 executing various types of programs; a RAM 24 used as a work area or the like at the time of execution of the various types of programs by the CPU 22; an HDD 26 in which are stored image data, a program for executing a color converting—printing processing routine which will be described later, and the like; a network interface 36 for connection with the network 16; and a bus 28 for connecting these together.

A scanner 30 which reads an original and generates image data; a printing section 32 which, on the basis of image data, records an electrostatic latent image onto a photosensitive body, develops the electrostatic latent image by using monochrome toner or color toner, and transfers and outputs the developed image onto a recording sheet; and an operation panel section 34 formed from operation buttons or an operation panel or the like, for instructing various types of processings of the printer 12, are further provided at the printer 12. These also are connected to the bus 28.

Note that it suffices for the printer 12 to have the general structures of conventionally-known printers. In the present exemplary embodiment, description of the other structures of and the general processings of the printer 12 is omitted.

Further, it suffices for the client PCs 14 to have general structures of conventionally-known personal computers, and description of the structures of and the general processings of the client PCs 14 is omitted.

The color space of the color image data used at the image processing system 10 will be described next. First, color image data of the RGB color space for displaying on a display is used at the client PC 14. Color image data of the CMYK color space, for outputting an image by respective toners of cyan (C), magenta (M), yellow (Y), and black (K), is used at the printer 12. Further, at the printer 12, when color space conversion is carried out from color image data of the RGB color space to color image data of the CMYK color space, a color space which does not depend on the device, e.g., the CIE-L*a*b* color space (hereinafter called "CIELAB color space"), also is used.

At the client PC 14, the color reproducible region which can be handled is limited in accordance with the characteristics of the device. Further, at the printer 12 as well, the color reproducible region which can be reproduced is similarly limited by the toners which serve as the color materials. The color image data of the RGB color space, which is prepared at the client PC 14, is, at the printer 12, converted into color image data of the CMYK color space and printed. At this time, the color image data prepared at the client PC 14 is color-space-converted into color image data of the CIELAB color space which does not depend on the device. In the CIELAB color space, color conversion is carried out, and thereafter, the color-converted color image data is color-space-converted into color image data of the CMYK color space.

When color-space-converting within CIELAB color space, the colors which can be reproduced at the client PC 14 are only a portion of the color gamut in CIELAB color space. Similarly, the colors which can be reproduced at the printer 12 as well are a partial color gamut of the CIELAB color space. Both the color gamuts overlap around the lightness axis, but there are cases in which colors which can be reproduced at the client PC 14 cannot be reproduced at the printer 12. In such cases, there is the need to convert into colors which can be reproduced at the printer 12. This processing is called gamut mapping processing, and various types of methods therefor are known. When such gamut mapping processing is carried out, a region which is color reproducible at the client PC 14 and a region which is color reproducible at the printer 12 are set in advance in the CIELAB color space, and the correspondence relationships for color-converting between the colors in the region which can be color-reproduced at the client PC 14 and the colors in the region which can be color-reproduced at the printer 12 are defined.

Operation of the first exemplary embodiment will be described next.

Figure 2:
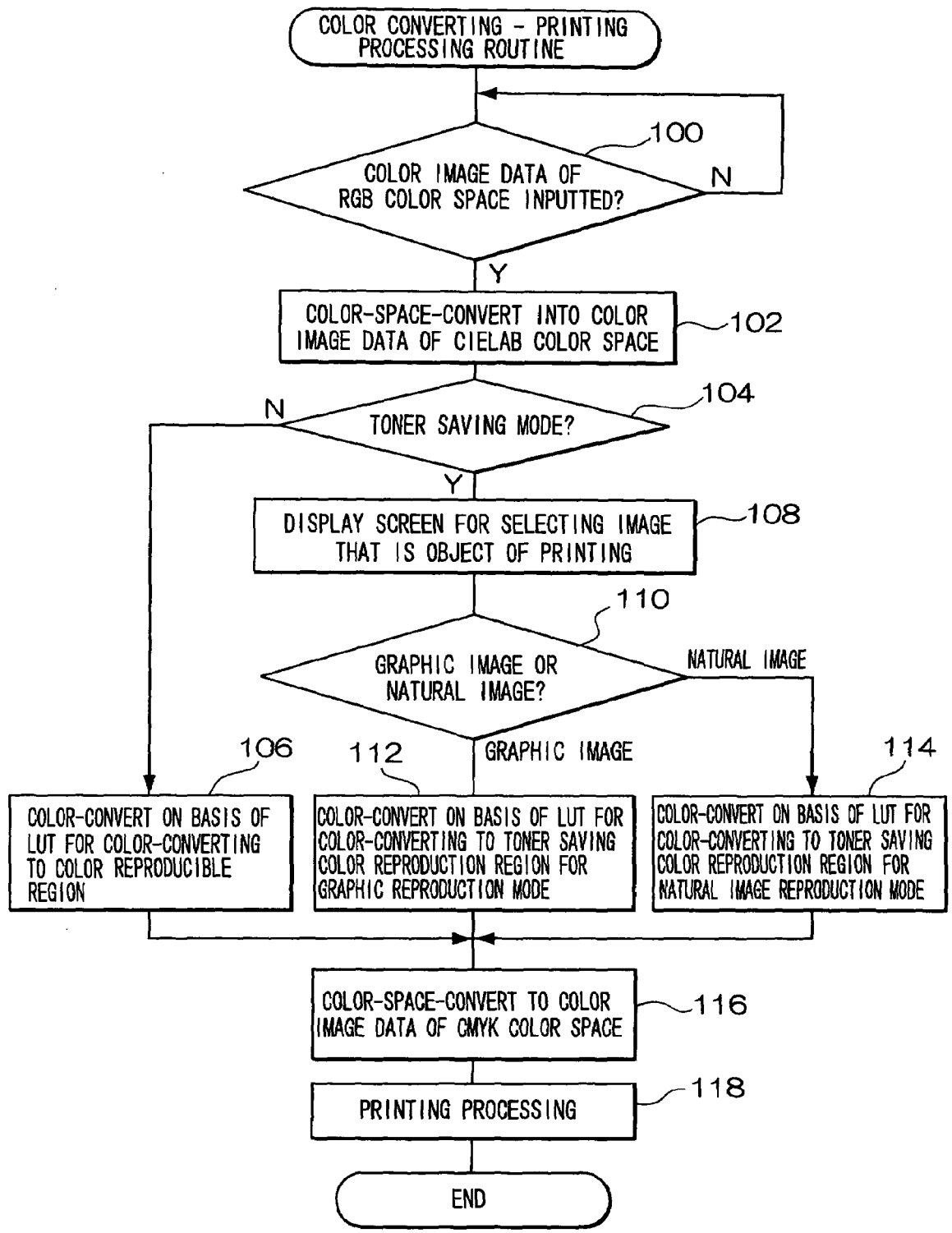
FIG. 2 is a flowchart showing the contents of a color converting—printing processing routine of a printer relating to the first exemplary embodiment of the present invention.

First, at the client PC 14, a user edits an image displayed on the display and generates color image data. Then, when an instruction to print the generated image data is given, a print instruction is outputted to the printer 12, and the color converting—printing processing routine shown in FIG. 2 is executed at the printer 12.

First, in step 100, it is judged whether or not color image data which is expressed in the RGB color space is inputted from the client PC 14. When color image data which is expressed in the RGB color space is inputted, the routine proceeds from step 100 to step 102 where color space converting processing is carried out so as to convert the color image data expressed in the RGB color space to color image data expressed in the CIELAB color space. In order to carry out this color space converting processing, color values in the CIELAB color space, which correspond to color values formed from color elements of various colors in the RGB color space, are stored in advance. This set of color values and color values is, for example, stored in the HDD 26 as a look-up table (LUT). Note that the color space conversion may be carried out by using a color profile (color conversion coefficients), and the color profile may be a defining formula which is determined by standards or a profile which has been acquired in the past. Further, the coefficients may be prepared by a method using a neural network, or by methods using a linear regression model or main component analysis, or the like. Or, a color patch or the like may be outputted directly and measured by a measuring device. In the present exemplary embodiment, explanation will be given of a case in which color space converting processing is carried out on the basis of a LUT.

Then, in step 104, it is judged whether or not a toner saving mode is set. By operating the operation panel section 34, the user can set in advance a toner saving mode which is a mode which curbs the amount of toner which is consumed. Here, if the toner saving mode is not set and the usual mode is set, the routine moves on to step 106. In step 106, on the basis of a LUT for color converting into a color reproducible region of the printer 12 which will be described later, in the CIELAB color space, the color image data is color-converted, and color converting processing is carried out which color-converts the color image data of the CIELAB color space, which was color-space-converted in step 102, into color image data expressed in the color reproducible region of the printer 12, and the routine moves on to step 116.

In this color converting processing, a conventionally-known gamut mapping processing method can be used. For example, clipping-type gamut mapping, in which common regions match calorimetrically and different regions are color-converted, or compression-type gamut mapping, which color-converts the entire region in order to store relative relationships, is used. In clipping-type gamut mapping, in order to store lightness, there is a method of projecting colors which are outside of the color reproducible region of the printer 12 without varying the hue and the lightness at the border of the color reproducible region of the printer 12, and, in order to store chroma, there is a method of projecting colors which are outside of the color reproducible region of the printer 12 without varying the hue at the border of the color reproducible region of the printer 12. Further, in compression-type gamut mapping, there is a method of carrying out color conversion in order to store gradation. Other than these, adaptive gamut mapping, which applies a different compression method per region, can be used. Or, a method combining clipping-type gamut mapping and compression-type gamut mapping, in which colorimetric matching is carried out at portions and compression is carried out at portions, may be used. By employing a conventionally-known gamut mapping processing method in this way, color conversion can be carried out while suppressing a deterioration in image quality, such that the impression of the color reproduction by the display of the client PC 14 and the impression of the color reproduction by the printer 12 do not vary greatly.

A LUT, in which are set correspondence relationships between colors in the color reproducible region of the client PC 14 and colors in the color reproducible region of the printer 12 in the CIELAB color space, is prepared in advance by using any of the above-described various methods in gamut mapping processing, and is stored in the HDD 26 as a LUT for color-converting from the color reproducible region of the client PC 14 to the color reproducible region of the printer 12 in the CIELAB color space. Color converting processing is carried out by using this LUT for color-converting to the color reproducible region.

On the other hand, if it is judged in step 104 that the toner saving mode is set, in step 108, a screen for selecting the image which is the object of printing is displayed, and the user is made to select whether the image which is the object of printing is a graphic image or a natural image. In step 110, it is judged whether the image which is the object of printing selected by the user is a graphic image or a natural image. If a graphic image is selected, in step 112, on the basis of a LUT for color conversion to a toner saving color reproduction region for the graphic reproduction mode which will be described later, the data is color-converted into color image data expressed in the toner saving color reproduction region of the CIELAB color space.

Note that the toner saving color reproduction region for the graphic reproduction mode is generated on the basis of a color gamut boundary which is prepared by a color gamut boundary generating method which will be described later. Further, by using any of the various known methods in gamut mapping processing, a LUT, in which are set the correspondence relationships between the colors in the color reproducible region of the client PC 14 and the colors in the toner saving color reproducible region for the graphic reproduction mode in the CIELAB color space, is prepared in advance and is stored in the HDD 26 as a LUT for color-converting to the toner saving color reproducible region for the graphic reproduction mode. On the basis of this LUT, color conversion is carried out, and color image data, which is expressed in the toner saving color reproduction region for the graphic reproduction mode in the CIELAB color space, is generated.

If it is judged in step 110 that a natural image is selected by the user as the image which is the object of printing, in step 114, on the basis of a LUT for color conversion to a toner saving color reproduction region for the natural image reproduction mode, the data is color-converted into color image data expressed in the toner saving color reproduction region of the CIELAB color space.

Note that, in the same way as in the case of a graphic image, the toner saving color reproduction region for the natural image reproduction mode is generated on the basis of a color gamut boundary which is prepared by the color gamut boundary generating method which will be described later. Further, by using any of the various known methods in gamut mapping processing, a LUT, in which are set the correspondence relationships between the colors in the color reproducible region of the client PC 14 and the colors in the toner saving color reproducible region for the natural image reproduction mode in the CIELAB color space, is prepared in advance and is stored in the HDD 26 as a LUT for color-converting to the toner saving color reproducible region for the natural image reproduction mode. On the basis of this LUT, color conversion is carried out, and color image data, which is expressed in the toner saving color reproduction region for the natural image reproduction mode in the CIELAB color space, is generated.

As methods for changing the color conversion in accordance with the type of the image, there are methods of changing the color conversion in accordance with the output mode or the profile intent. Further, the image object may be differentiated in accordance with whether it is a raster image or a vector image, and the color conversion may be changed.

Then, in step 116, color space converting processing is carried out which converts the color image data of the CIELAB color space, which was color-converted in any of steps 106, 112, or 114, into color image data expressed in the CMYK color space. Note that, in the same way as in the color space converting processing in above-described step 102, color values formed from color elements of the various colors in the CMYK color space are determined for the color values in the CIELAB color space. This set of color values and color values is stored in the HDD 26 as a look-up table (LUT), and the color space converting processing is carried out on the basis of this LUT.

In next step 118, on the basis of the color image data expressed in the CMYK color space which was generated in step 116, printing processing is executed by the printing section 32, an image is formed on a recording sheet by toners of the respective colors, and the color converting—printing processing routine ends.

The color gamut boundary generating method, which generates the color gamut boundary of the toner saving color reproduction region, will be described next.

In a case in which the color expressed by the color image data is kept within a predetermined color reproduction region by gamut mapping processing, it must be judged whether or not the color of the color image data is reproducible. If the color is not reproducible, it must be investigated which color it should be converted into in order to be kept within the range of the reproducible region. To this end, the boundary of the color reproduction region (color gamut boundary) must be determined. The color gamut boundary is generated in accordance with the color gamut boundary generating method described hereinafter.

As shown in FIG. 3, the color gamut boundary generating method for limiting each toner amount is realized by a device profile generating section 50, a color space converting section 52, a color gamut boundary generating section 54, and a limit value setting section 56.

The limit value setting section 56 receives, as needed, a designation of an arbitrary maximum gradation limit value in the color space of the object device, or a maximum gradation value condition relating to a maximum gradation limit value. In this way, it is possible to set a limiting condition which limits in accordance with, for example, a maximum gradation limit value or a maximum gradation limit value based on a maximum gradation condition, of each toner color.

The device profile generating section 50 generates a boundary point group which structures a color gamut boundary in the CMYK color space of the printer 12 which satisfies the limiting condition limited by the maximum gradation limit value of each toner color which is set at the limit value setting section 56. Here, the points on the color gamut boundary in the CMYK color space which are extracted as the boundary point group are arbitrary. For example, it is good to extract at least the vertices structuring the color gamut boundary, and points on the respective axes connecting the vertices.

The color space converting section 52 converts from the boundary point group of the CMYK color space of the printer 12 generated at the device profile generating section 50, into a boundary point group in the CIELAB color space. A forwardly-directed model of reproduced color estimation of the printer 12 can be used in this conversion.

The color gamut boundary generating section 54 selectively extracts, for example, boundary points which are suitable for use, from the boundary point group generated at the color space converting section 52, and generates color gamut boundary information which is connected only at the extracted, partial boundary point group. In this way, color gamut boundary information which is easy to use can be obtained. Note that the present invention may be structured without providing this color gamut boundary generating section 54.

Figure 4A:
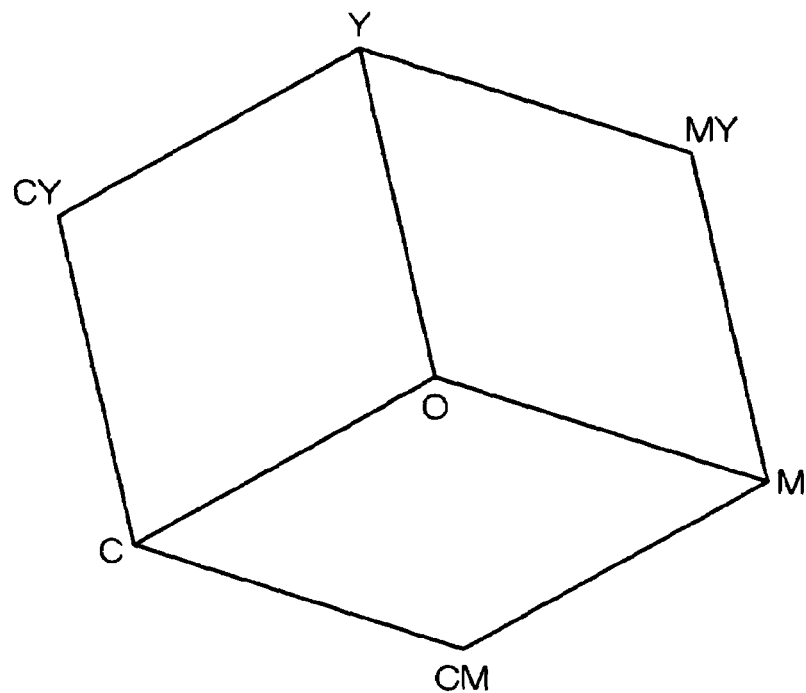
FIGS. 4A and 4B are explanatory diagrams showing examples of color gamut boundaries of the CMYK color space.
Figure 4B:
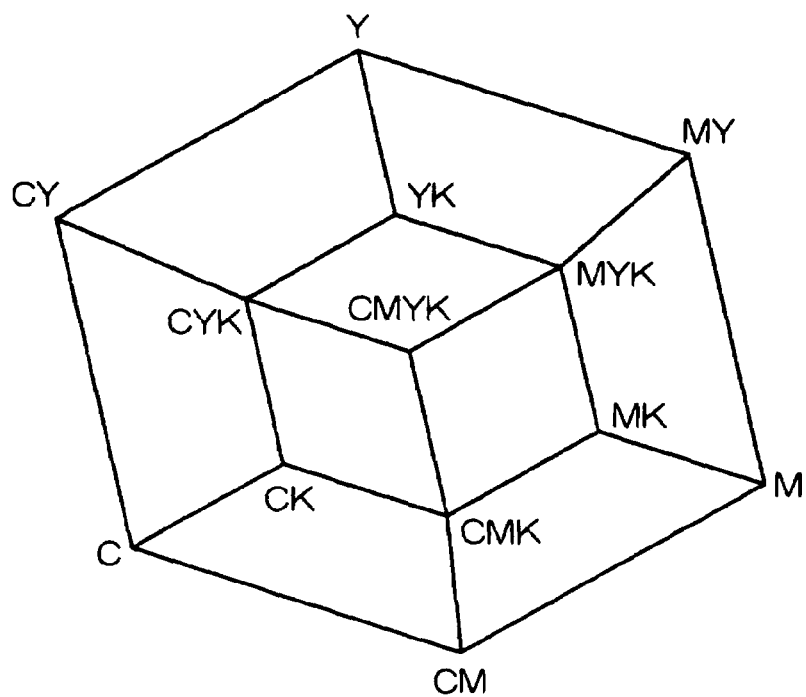

The points of the color gamut boundary in the CMYK color space of the printer 12 can be expressed by planes such as shown in FIG. 4. As described above, the points structuring the color gamut boundary are points satisfying a predetermined condition, and points other than the points which satisfy the aforementioned condition are points at the interior of the color gamut.

At the limit value setting section 56, when, for example, a maximum gradation limit value Ka of black K is designated, the device profile generating section 50 generates a boundary group of the CMYK color space of the printer 12 as described above. At this time, the limit range of black K at the lower half is set. The limit of the maximum gradation value is handled by changing the structure of the vertices in FIG. 4B from 100% to Ka %.

The color space converting section 52 will be described next. In order to carry out color space conversion from the boundary point group to a boundary point group in the CIELAB color space at the color space converting section 52, a LUT which prescribes the correspondence relationships between the colors in the CMYK color space and the colors in the CIELAB color space is readied and color space conversion is carried out on the basis of this LUT, in the same way as in the above-described case of carrying out color space conversion from the RGB color space to the CIELAB color space.

Further, the color gamut boundary generating section 54 connects the boundary point group in the CIELAB color space as vertices, so as to structure planes and form a polygon. In this way, the present invention can be easily used in various applications, such as making the color gamut boundary of the printer 12 three-dimensionally visible by utilizing a widely-used visualizing tool, or the like. Moreover, at the time of preparing the three-dimensional information which connects the boundary point group, there are cases in which it is desired to exclude unnecessary regions, or arrange the vertices at uniform intervals, or structure a detailed color gamut. In such cases, it suffices to structure the color gamut boundary from some of the boundary points selected from the boundary point group obtained at the color space converting section 52.

A color gamut boundary generating method for limiting the total amount of the toners will be described next. Note that portions which are similar to those of the above-described color gamut boundary generating method for limiting each toner amount are denoted by the same reference numerals, and description thereof is omitted.

Figure 5:
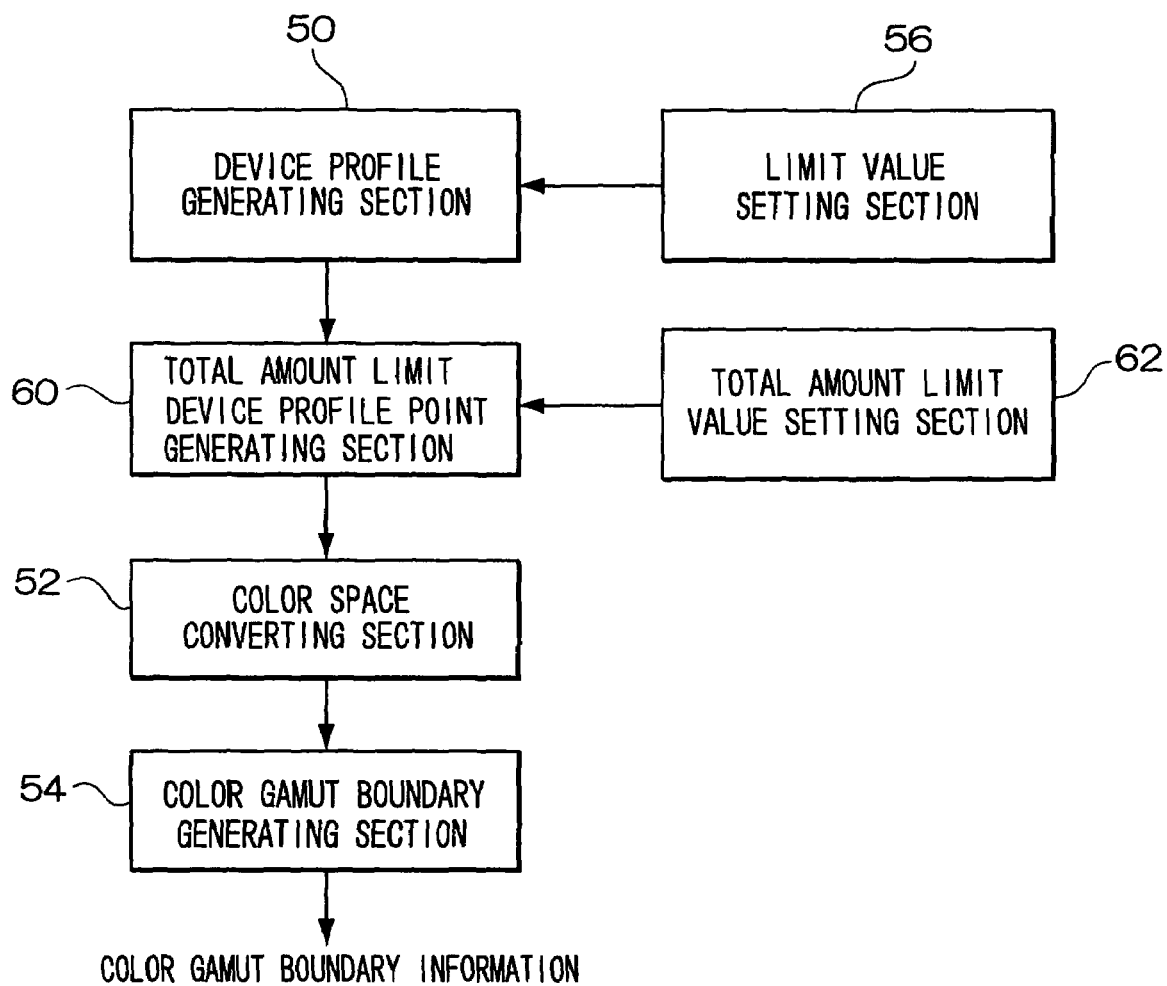
FIG. 5 is a block diagram showing the state of a color gamut boundary generating method for limiting a total amount of toner amounts relating to the first exemplary embodiment of the present invention.

As shown in FIG. 5, the color gamut boundary generating method for limiting the total amount of the toners is realized by the device profile generating section 50, the color space converting section 52, the color gamut boundary generating section 54, the limit value setting section 56, a total amount limit value setting section 62, and a total amount limit device profile point generating section 60. Here, explanation will be given by using as an example a case in which, after generating the boundary point group previously, the boundary point group is changed in order to conform to the condition of the total amount limit.

The total amount limit value setting section 62 receives a designation of a total amount limit value which limits the total sum of the respective color elements in the CMYK color space of the printer 12, and transfers it to the total amount limit device profile point generating section 60. In accordance with the total amount limit value designated at the total amount limit value setting section 62, the total amount limit device profile point generating section 60 changes the boundary point group which was generated at the device profile generating section 50. Note that the color space converting section 52 color-space-converts from the boundary point group of the CMYK color space of the printer 12 after it has been changed at the total amount limit device profile point generating section 60, to a boundary point group in the CIELAB color space.

The above structure will be described in further detail. First, a toner total amount limit value G is designated at the total amount limit value setting section 62. Namely, the condition $$C+M+Y+K \leq G \quad \text{(Formula 1)}$$

is designated.

After the boundary point group is generated at the device profile generating section 50, the generated boundary point group in the CMYK color space of the printer 12 is updated at the total amount limit device profile point generating section 60 so as to become less than or equal to the total amount limit value G At this time, if an arbitrary boundary point of the boundary point group satisfies the condition of the total amount limit value G (i.e., Formula 1), no processing is carried out, whereas if the condition is not satisfied, processing for limiting the total amount is carried out. This processing for total amount limiting can be realized by, for example, fixing the toner amount of one color, making the constituent ratio of the other toner amounts fixed, and combining them into a total amount. Namely, given that a fixed toner amount is I, and boundary points of the device are (I, A1, A2, A3), and device profile points subjected to total amount regulating are (I, A1', A2', A3'), A1', A2' and A3' are obtained by:

$$A1'=(A1 \times (G-I))/(A1+A2+A3)$$

$$A2'=(A2 \times (G-I))/(A1+A2+A3)$$

$$A3'=(A3 \times (G-I))/(A1+A2+A3) \quad \text{(Formula 2)}$$

Here, there are the following two methods of regulating in accordance with the fixed toner. In regulating method 1, K is fixed, the ratio of C:M:Y is fixed, and the total amount of CMYK is adjusted to the total amount limit value G. Namely, this is a method of making the fixed amount I in formula (2) be the K amount, and making A1, A2, A3 be the CMY amounts respectively. Regulating method 2 is a method in which the one amount which exhibits the maximum value among CMYK is fixed, the ratio of the other three colors is fixed, and the total amount of CMYK is adjusted to the total amount limit value G. For example, if the toner showing the maximum amount is C, it suffices to make the fixed amount I in formula (2) be the C amount, and to make A1, A2, A3 be the KMY amounts respectively.

In this way, a boundary point group which satisfies the total amount limit can be obtained. Note that the colors which the respective boundary points express differ visually in accordance with the total amount limit such as that described above. However, there is no change in that fact that they are points on a color gamut boundary which satisfies the total amount limit in the CMYK color space of the printer 12.

In accordance with the above-described color gamut boundary generating method, a color gamut boundary is generated, and on the basis of the generated color gamut boundary, a color reproduction region can be determined. Here, the toner saving color reproduction regions in the graphic reproduction mode and in the natural image reproduction mode are determined as follows.

In the present exemplary embodiment, the color gamut boundary, which limits the toner amounts and whose effect on output color reproduction is slight, is generated in accordance with the type of the image which is the object of printing (a graphic image or a natural image). Because the effects on the reproduced color also differ in accordance with the image, the limiting condition in accordance with the maximum gradation limit value or the total amount limit value is set according to which of a graphic image and a natural image is to be color-reproduced. Note that, if the maximum gradation is limited by setting the maximum gradation limit value to be small, the effect is slight from saturated colors to the shadow color regions. On the other hand, if the total amount is limited by setting the total amount limit value to be low, the effect is slight only at the shadow color regions.

In the case of a natural image, reproduction of saturated colors is not that important. Reproduction of intermediate colors and shadow colors, and the feeling of contrast, greatly affect the impression of the image. Even if the saturated colors of gradation are limited, there is little impact on the image quality. Therefore, the maximum gradation is limited by setting the maximum gradation limit value to be low. Further, in order to suppress color region shrinkage of the shadow regions, the total amount limit is relaxed by setting the total amount limit value to be high.

Further, in the case of a graphic image, conversely, reproduction of saturated colors is important, and greatly affects the impression of the image. Colors of the shadow regions, other than black, have little effect on the impression of the image quality. Even if the total amount is limited, there is little impact on the image quality, and therefore, the total amount is limited by setting the total amount limit value to be small.

Accordingly, in the case of a natural image, in the color gamut boundary generating method for limiting each toner amount described above, the color gamut boundary is generated by setting a limiting condition which makes the maximum gradation limit value small in order to carry out maximum gradation limiting. In this way, setting is carried out such that a color gamut such as shown in FIG. 6A is generated, the color region from saturated colors to the shadow color regions is narrowed, and reproduction is carried out with saturated colors being limited and colors in the low and medium chroma regions and achromatic colors not being limited.

In the case of a graphic image, in the color gamut boundary generating method for limiting the total amount of the toners described above, the color gamut boundary is generated by setting a limiting condition which makes the total amount limit value small in order to limit the total amount of the toners. In this way, setting is carried out such that a color gamut such as shown in FIG. 6B is generated, and only the shadow color regions are narrowed, and the saturated colors are maintained.

Figure 6A:
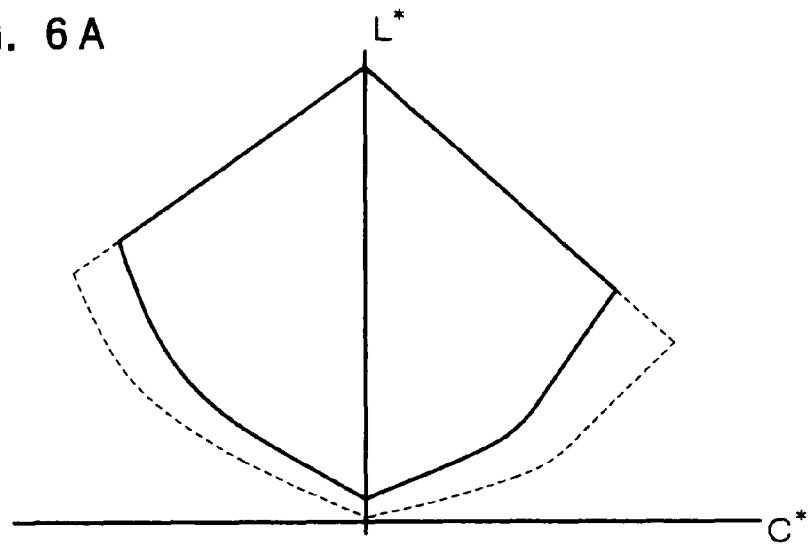
FIGS. 6A through 6C are explanatory diagrams showing relationships between a toner saving color reproduction region and a color reproducible region of the printer in the CIELAB color space.
Figure 6B:
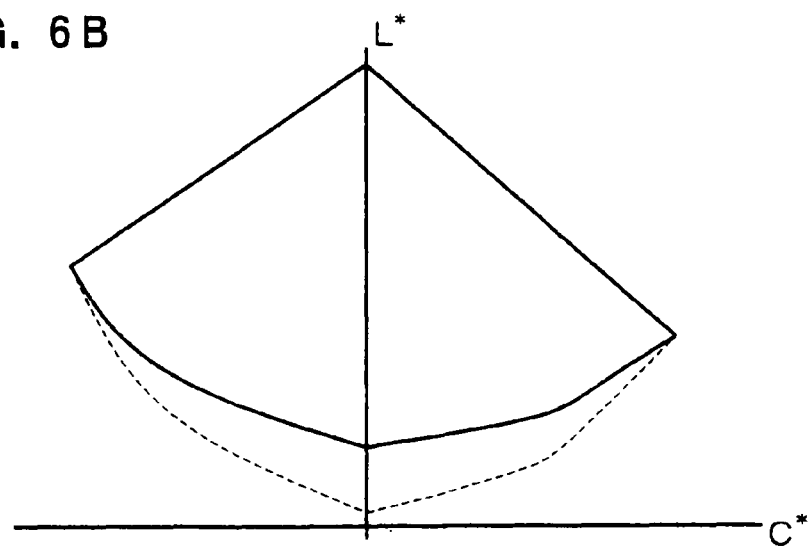

Note that, in FIGS. 6A and 6B, the solid lines show the toner saving color reproduction region in the CIELAB color space, and the dashed lines show the color reproducible region of the printer 12. Further, a cross-section of the color gamut is shown, and is a plane which passes through the lightness axis (L*) and is a cross-section which cuts-through the color reproducible region of the printer 12. The coordinate system in this cross-section is such that the vertical axis is L* which represents lightness, and the horizontal axis is C* which represents chroma.

In this way, by using a toner saving color reproduction region which is generated at the generated color gamut boundary, color converting processing in the CIELAB color space is carried out, and the color-converted color image data is color-space-converted into color image data which is expressed in the CMYK color space, and is printed. In this way, a graphic image is printed with the saturated colors being reproduced correctly and the colors of the shadow regions being reproduced so as to be limited, such that the impact on the image quality of the inputted color image data is suppressed. Further, a natural image is printed by the saturated colors of the gradation being reproduced so as to be limited, and the shadow colors being reproduced with the limits thereon mitigated, such that the impact on the image quality of the inputted color image data is suppressed.

As described above, in accordance with the image processing system relating to the first exemplary embodiment, color image data which is expressed in the CIELAB color space is color-converted so as to be expressed in a toner saving color reproduction region which is narrowed such that the amount of toner which is consumed is curbed. Thereafter, the data is color-space-converted into the CMYK color space and printed. Therefore, the amount of toner which is consumed can be curbed.

Further, by carrying out color conversion to the toner saving color reproduction region by gamut mapping processing in the CIELAB color space which does not depend on the device, a deterioration in image quality can be suppressed by using any of various types of conventionally-known methods of gamut mapping processing. Moreover, because deterioration in image quality is suppressed, this method is suitable for regular use even though it is a toner saving mode, and the amount of toner which is consumed in regular use can be curbed.

The method of curbing the amount of toner which is consumed, and the method of curbing the amount of toner which is consumed in accordance with the image type on the basis of the impact that such curbing has on image reproduction, can be switched between. In natural image reproduction, a decrease in the chroma of saturated colors has little impact, and it suffices to reproduce the image without limiting colors in the low and medium chroma regions and achromatic colors. For a graphic image, saturated color reproduction and continuity are important, and the saturated colors must be maintained. Therefore, the method of limiting is changed in accordance with the characteristics of the output image, and the amount of toner which is consumed can be reduced while the impact on the image quality is suppressed.

Note that the above exemplary embodiment describes, as an example, a case in which color conversion in the CIELAB color space is carried out in accordance with a LUT. However, the present invention is not limited to the same, and the color values after conversion may be computed by a formula for carrying out color conversion.

Further, an example has been described of a case in which the color space converting processing from the RGB color space to the CIELAB color space, and the color converting processing in the CIELAB color space, and the color space converting processing from the CIELAB color space to the CMYK color space, are carried out at a printer. However, the color space converting processing from the RGB color space to the CIELAB color space, and the color converting processing in the CIELAB color space may be carried out at a client PC. Further, these color space processings and color converting processings may be carried out at an intermediate device provided between the client PC and the printer.

The above describes, as an example, a case in which a limiting condition in accordance with one of a maximum gradation limit value and a total amount limit value is set when generating the color gamut boundary of the toner saving color reproduction region. However, the color gamut boundary may be generated on the basis of a limiting condition which combines both limit values.

As an example, a case has been described in which color image data expressed in the RGB color space is inputted from the client PC 14. However, the above-described color space converting processing and color converting processing may be carried out on color image data which is expressed in the RGB color space and is read-in by a scanner.

A case in which the CIELAB color space is used as the color space which does not depend on the device is described above as an example. However, the present invention is not limited to the same, and another color space which does not depend on the device may be used.

A second exemplary embodiment will be described next. Note that, because the structure of an image processing system relating to the second exemplary embodiment is the same as that of the first exemplary embodiment, the same reference numerals are applied, and description relating to the structure is omitted.

The second exemplary embodiment differs from the first exemplary embodiment with regard to the point that, in the second exemplary embodiment, the limiting condition for generating the toner saving color reproduction region is set in accordance with a combination of values of the respective color elements of the toners.

In the color gamut boundary generating method relating to the second exemplary embodiment, by combining values of the respective color elements of CMYK, a limiting condition which relaxes or strengthens the regulation in accordance with the maximum gradation limit value is set, and an optimal color gamut boundary which corresponds to the combination of the values of the respective color elements of CMYK is generated.

For example, at the time of using the M color alone, the amount is limited to 80%. However, in the case of a combination of M and K, in order to mitigate fading of the shadow portions, the limiting condition is relaxed such that M is allowed up to 100%. In this way, fading of the shadow regions is prevented, and the impact, for example, in the case of reproducing a natural image or the like, can be reduced.

Figure 6C:
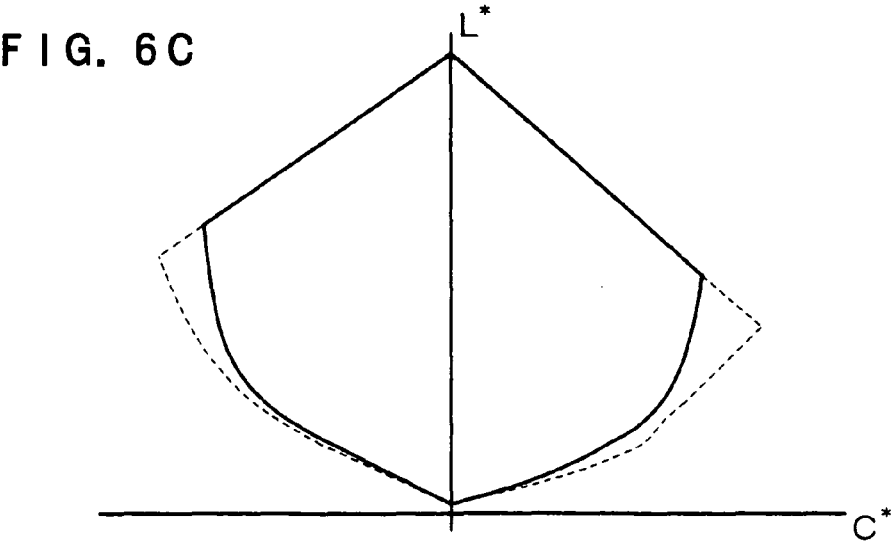

For example, as shown in FIG. 6C, in accordance with the color gamut (the combination of the values of the color elements), the maximum gradation limit value of the limiting condition is made to be large such that maximum gradation limiting of the shadow regions is mitigated, or, on the other hand, the maximum gradation limit value is made to be small such that maximum gradation limiting is carried out for Cusp colors (maximum chroma colors). By easing the limitation on the amount of toner in the shadow regions in this way, fading of the shadow regions is suppressed, and the impact on natural image reproduction is reduced.

For example, when the total sum of CMYK is less than or equal to 100, the maximum gradation limit value of M is made to be 80. When the total sum is from 100 to 200, the limit value of M is changed to be from 80 to 100 accordance with the total sum. If the total sum is greater than or equal to 200, the maximum gradation limit value of M is made to be 100. In this way, the maximum gradation limit value can be set in accordance with the combination of the values of the color elements of CMYK.

As described above, in accordance with the image processing system relating to the second exemplary embodiment, by designating an appropriate maximum gradation limit value for each combination of values of the respective color elements of the toners, the impact on color reproduction is reduced, and the amount of toner which is consumed can be curbed.

Note that a uniform maximum gradation limit or total amount limit such as described in the first exemplary embodiment, and a maximum gradation limit which corresponds to the combination of values of the color elements in the present exemplary embodiment, can be combined. In this case, for example, it suffices to generate a color gamut boundary point group in accordance with the uniform maximum gradation limit or total amount limit, and thereafter, on the basis of the maximum gradation limit which corresponds to the combination of values of color elements, change the color gamut boundary point group and generate a color gamut boundary. In this way, the combining of limitations, which cannot be realized by the simple maximum gradation limitation or total amount limitation, can be carried out.

A third exemplary embodiment will be described next. Note that portions which are structured similarly to the first exemplary embodiment are denoted by the same reference numerals, and description thereof is omitted.

The third exemplary embodiment differs from the first exemplary embodiment with regard to the point that, in the third exemplary embodiment, the limiting condition for generating the toner saving color reproduction region is set in accordance with the region of a specific color in the CMYK color space.

In the color gamut boundary generating method relating to the third exemplary embodiment, for the region of a specific color in the CMYK color space, a limiting condition which relaxes or strengthens the limitation in accordance with the maximum gradation limit value is set, and an optimal color gamut boundary is generated.

For example, for the red color (M and Y) region which has a great effect on image quality, the maximum gradation limit value is set to be large such that the limitation is eased. In this way, fading of the region of a specific color is prevented, and the impact on image quality can be reduced.

Further, for example, for a region in which Y is greater than or equal to 90, the maximum gradation limit value of M is made to be 100. For a region where Y is 70 to 90, the maximum gradation limit value of M is varied in the range of 100 to 80 in accordance with the value of Y. For a region where M is greater than or equal to 90, the maximum gradation limit value of Y is made to be 100. Further, for a region where M is 70 to 90, the maximum gradation limit value of Y is varied in the range of 100 to 80 in accordance with the value of M. For other regions, the maximum gradation limit values of M and Y are made to be 80, and the maximum gradation limit values of C and K can always be prescribed to be 80.

In the same way as in the second exemplary embodiment, the toner saving color reproduction region may be generated by generating a color gamut boundary in accordance with a limitation combining the uniform maximum gradation limit or total amount limit, and the maximum gradation limit corresponding to the combination of colors, and the maximum gradation limit for a specific color of the present exemplary embodiment.

Further, an example is described above of a case in which the limit region is prescribed in the CMYK color space, but the limit region may be prescribed in the CIELAB color space. For example, in the CIELAB color space, for the region whose hue angle is from 30° to 40°, the maximum gradation limit value may be prescribed to be 100, and for the regions from 20° to 30° and from 40° to 50°, the maximum gradation limit value may be varied in the range of 100 to 80 in accordance with the hue angle, and for regions of other hue angles, the maximum gradation limit value may be prescribed to be 80.

A fourth exemplary embodiment will be described next. Note that portions which are structured similarly to the first exemplary embodiment are denoted by the same reference numerals, and description thereof is omitted.

The fourth exemplary embodiment differs from the first exemplary embodiment with regard to the point that, in the fourth exemplary embodiment, the toner saving color reproduction region is generated by geometrically narrowing the usual color gamut boundary of the CMYK color space.

Figure 7:
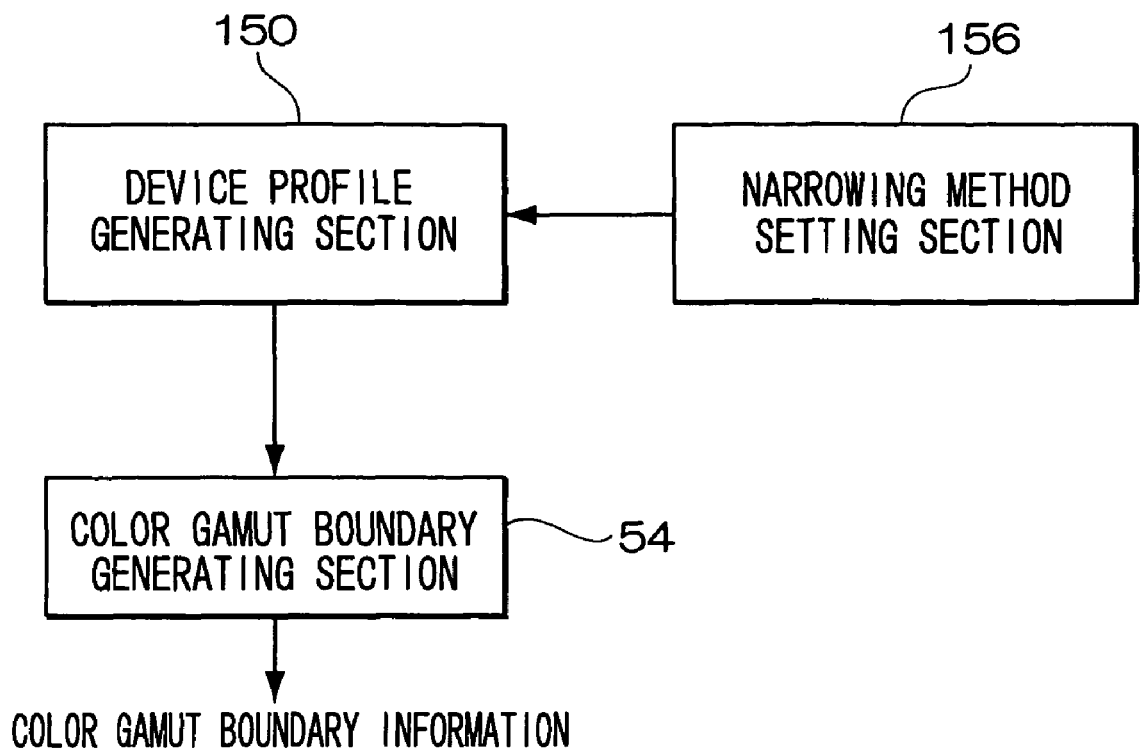
FIG. 7 is a block diagram showing the state of a color gamut boundary generating method relating to a fourth exemplary embodiment of the present invention.

As shown in FIG. 7, a color gamut boundary generating method relating to the fourth exemplary embodiment is realized by a device profile generating section 150, the color gamut boundary generating section 54, and a narrowing method setting section 156.

The device profile generating section 150 geometrically narrows the usual color gamut boundary in the CIELAB color space by a narrowing method which is set at the narrowing method setting section 156, and generates a boundary point group which structures a narrowed color gamut boundary.

The narrowing method setting section 156 receives the designation of the method for narrowing the usual color gamut boundary. Examples of narrowing methods which are received are: as shown in FIG. 8A, a method of narrowing by moving, in the low chroma direction, the usual color gamut boundary positions in the CIELAB color space, and a method of narrowing by moving, toward a specific point (the white point) the usual color gamut boundary positions in the CIELAB color space. Further, in the method of narrowing by moving toward a specific point, the specific point may be set in accordance with the hue.

Figure 8B:
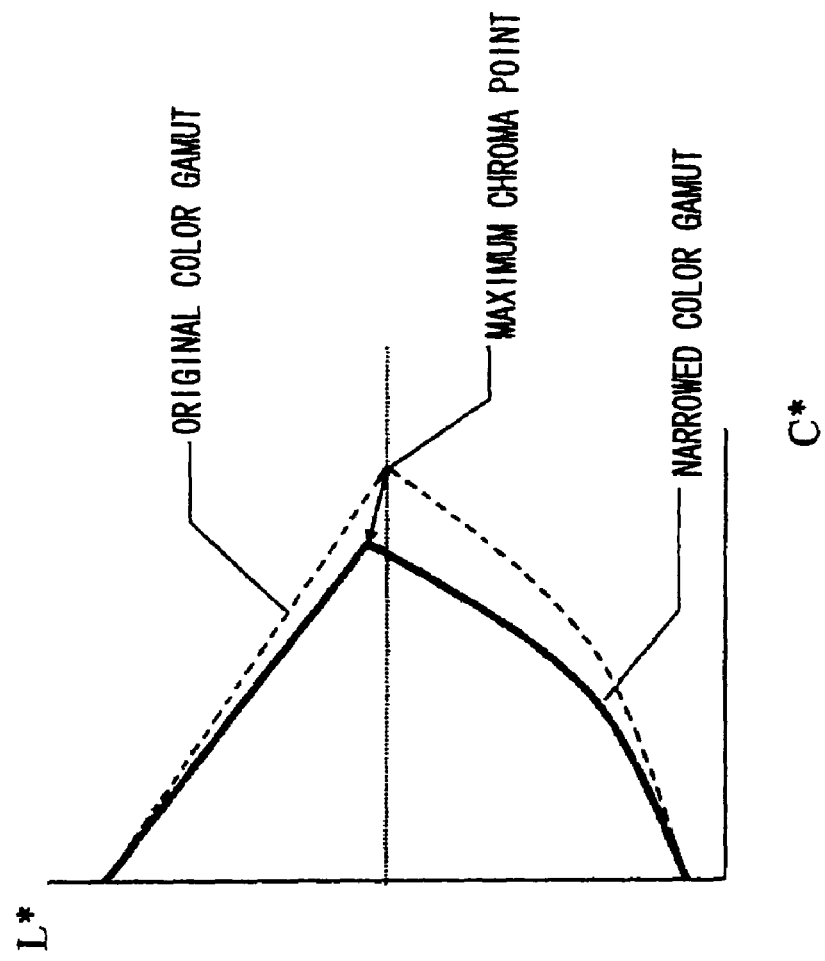
FIGS. 8A and 8B are explanatory diagrams showing examples of the relationship between a usual color gamut boundary and a narrowed color gamut boundary in the CIELAB color space.
Figure 8A:
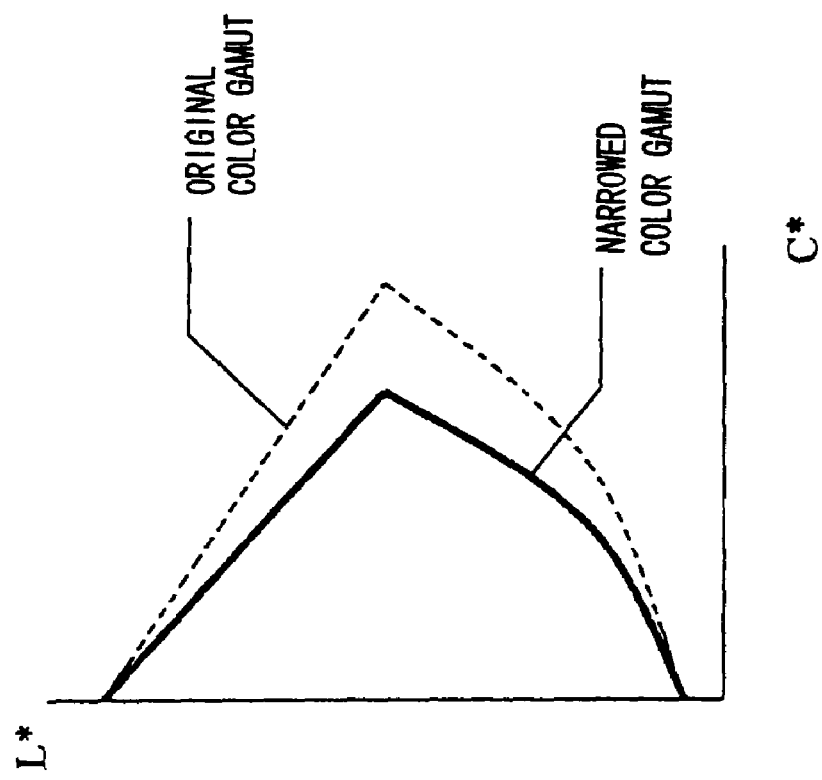
Figure 9B:
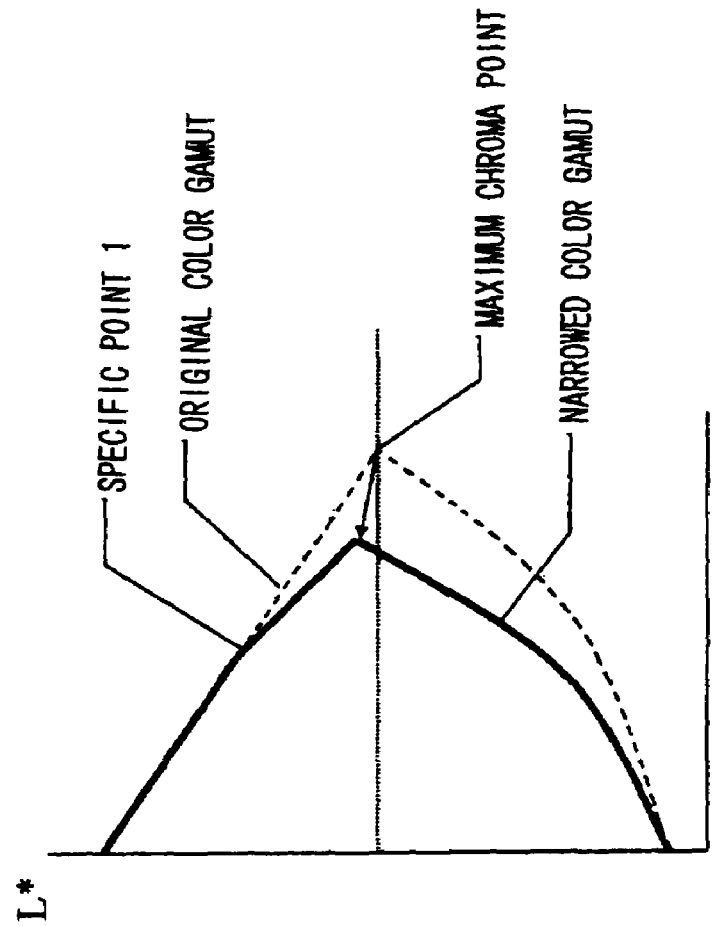
FIGS. 9A and 9B are explanatory diagrams showing other examples of the relationship between a usual color gamut boundary and a narrowed color gamut boundary in the CIELAB color space.
Figure 9A:
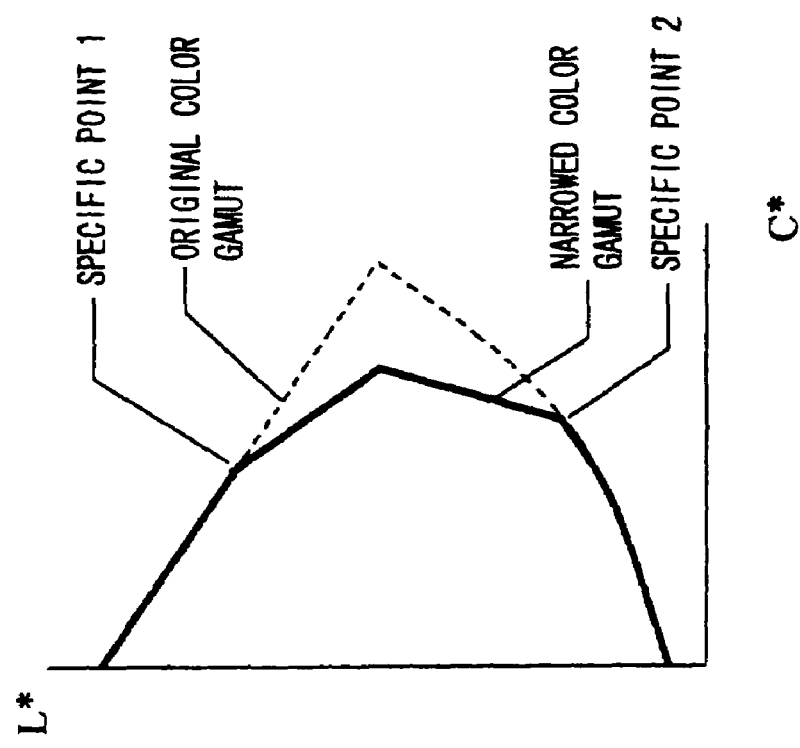

Moreover, as the narrowing method at the narrowing method setting section 156, there are: as shown in FIG. 8B, a method of narrowing the usual color gamut by moving the maximum chroma point of each hue of the usual color gamut in the CIELAB color space toward a point where the lightness is higher than the maximum chroma point and which is at the inner side of the usual color gamut; and, as shown in FIG. 9A, a method of narrowing the usual color gamut by moving, in the low chroma direction, regions where the chroma is higher than specific points of the usual color gamut, without changing the region from white to the specific point of each hue and without changing the region from black to the specific point of each hue, of the usual color gamut in the CIELAB color space. Moreover, as shown in FIG. 9B, the usual color space may be narrowed by moving, in the low chroma direction, a region where the chroma is higher than a specific point of the usual color gamut, without changing only the region from white to the specific point of each hue of the usual color gamut in the CIELAB color space and by making the region at the black side variable.

Further, as shown in FIG. 10, there is also a method of making the narrowed region be a common region which is common to the usual color gamut in the CIELAB color space and to a region for narrowing which is a region in which the usual color gamut is shifted in the high lightness direction. Note that the region for narrowing may be obtained by shifting the usual color gamut in the low chroma direction, or may be obtained by shifting the usual color gamut in the high lightness direction and the low chroma direction.

Then, the color gamut boundary generating section 54 generates color gamut boundary information from the boundary point group generated at the device profile generating section 150.

In the above described method of narrowing by moving the maximum chroma point toward a point at which the lightness is higher than the original maximum chroma point and which is at the inner side of the color gamut, the color tint is lowered and the amount of toner which is consumed is reduced by moving the maximum chroma point in the low chroma direction. However, at this time, if the lightness is moved toward the side higher than it is originally, depending on the case, there is the possibility that the moved maximum saturation point will jump to outside of the color gamut. Therefore, the maximum chroma point must be moved toward the inner side of the color gamut. Further, when the maximum chroma point is merely moved in the low chroma direction, there are cases in which the amount of toner which is consumed conversely increases for the following reasons, and therefore, the maximum chroma point must be moved further toward the higher lightness side.

In a case in which the maximum chroma point is a primary color or a secondary color, and the third toner amount is 0 of necessity, and only the chroma of that color is lowered while the same lightness is maintained, the amount of toner which structures the original color is reduced, but there are cases in which the third toner which had been 0 until then is put-in for muddying, and, depending on the condition, the total amount increases due to these additions and reductions. Therefore, the maximum chroma point must be moved to a higher lightness. For example, if an attempt is made to lower the chroma of C=100 while maintaining the same lightness, the value of C decreases, but M and Y increase, and therefore, there are cases in which the total amount conversely becomes greater than 100. Further, if muddying is carried out by using K as with 100% UCR, the amount of toner which is consumed is reduced, but there are many cases in which ink is not put in the high chroma region. Because the tendency for the total amount to increase becomes stronger in such cases, in order to avoid this and reliably reduce the amount of toner which is consumed, the maximum saturation point is moved not only in the chroma direction but the lightness thereof also is increased slightly, and the total amount of the toner can thereby reliably be reduced.

Further, in the above-described method of narrowing by moving a region whose chroma is higher than a specific point in the low chroma direction, it is best to not narrow the region by making the narrowed region follow along the boundary from white or black up to part of the way to the specific point, because color reproduction of the region made to follow the boundary greatly affects the image quality. Further, in the same way as the above-described case of moving the maximum chroma point, the color on the upper side boundary is a primary color or a secondary color, and one color must be 0. Narrowing the upper side causes muddying in the same way as described above, and as a result, there are cases in which the total amount of the toner increases. Therefore, it is preferable to not narrow the region by making the region follow along the boundary up until part of the way to the specific point.

A fifth exemplary embodiment will be described next. Note that portions which are structured similarly to the first exemplary embodiment are denoted by the same reference numerals, and description thereof is omitted.

The fifth exemplary embodiment differs from the first exemplary embodiment with regard to the point that, in the fifth exemplary embodiment, the inputted color image data of the RGB color space is directly converted into color image data of the CMYK color space, without being color-space-converted into the CIELAB color space.

A LUT is stored in advance in the HDD of the printer relating to the fifth exemplary embodiment, as a LUT for color conversion and color space conversion to the color reproducible region of the CMYK color space. This LUT which is stored in the HDD prescribes the correspondence relationships between color values of the RGB color space and color values of the CMYK color space in a case in which, as in the color converting processing routine of the first exemplary embodiment, color-space-conversion from the RGB color space to the CIELAB color space is carried out, and color conversion from colors in the color reproducible region of the client PC 14 to colors in the color reproducible region of the printer is carried out, and thereafter, color-space-conversion is carried out from the CIELAB color space to the CMYK color space.

A LUT, which prescribes the correspondence relationships between color values of the RGB color space and color values of the CMYK color space in a case in which, as in the color converting processing routine of the first exemplary embodiment, color-space-conversion from the RGB color space to the CIELAB color space is carried out, and color conversion from colors in the color reproducible region of the client PC 14 to colors in a toner saving color reproduction region for the graphic reproduction mode is carried out, and thereafter, color-space-conversion is carried out from the CIELAB color space to the CMYK color space, is stored in advance as a LUT for color conversion and color space conversion to the toner saving color reproduction region of the CMYK color space for the graphic reproduction mode.

Further, a LUT, which prescribes the correspondence relationships between color values of the RGB color space and color values of the CMYK color space in a case in which color-space-conversion from the RGB color space to the CIELAB color space is carried out, and color conversion from colors in the color reproducible region of the client PC 14 to colors in a toner saving color reproduction region for the natural image reproduction mode is carried out, and thereafter, color-space-conversion is carried out from the CIELAB color space to the CMYK color space, is stored in advance as a LUT for color conversion and color space conversion to the toner saving color reproduction region of the CMYK color space for the natural image reproduction mode.

A color converting processing routine relating to the fifth exemplary embodiment will be described next by using FIG. 11. Note that processings which are similar to those of the first exemplary embodiment are denoted by the same reference numerals, and detailed description thereof is omitted.

First, in step 100, it is judged whether or not color image data expressed in the RGB color space is inputted from the client PC 14. When color image data expressed in the RGB color space is inputted, the routine proceeds from step 100 to step 104 where it is judged whether or not the toner saving mode is set. In the case of the usual mode, the routine moves on to step 200 where, on the basis of the LUT for color conversion and color space conversion to the color reproducible region of the CMYK color space, converting processing is carried out which converts the color image data of the RGB color space inputted in step 100 into color image data expressed in the color reproducible region of the CMYK color space, and the routine proceeds to step 118.

On the other hand, if it is judged in step 104 that the toner saving mode is set, in step 108, a screen for selecting the image which is the object of printing is displayed, and in step 110, it is judged whether the image which is the object of printing selected by the user is a graphic image or a natural image. If a graphic image is selected, in step 202, on the basis of the LUT for color conversion and color space conversion to the toner saving color reproduction region of the CMYK color space for the graphic reproduction mode, the color image data of the RGB color space inputted in step 100 is converted into color image data expressed in the toner saving color reproduction region of the CMYK color space for the graphic reproduction mode.

Further, if it is judged in step 110 that a natural image is selected by the user as the image which is the object of printing, in step 204, on the basis of the LUT for color conversion and color space conversion to the toner saving color reproduction region of the CMYK color space for the natural image reproduction mode, the color image data of the RGB color space inputted in step 100 is converted into color image data expressed in the toner saving color reproduction region of the CMYK color space for the natural image reproduction mode.

In next step 118, printing processing is executed on the basis of the color image data expressed in the CMYK color space which was converted in step 200, 202 or 204, and the color converting—printing processing routine ends.

While the present invention has been illustrated and described with respect to specific exemplary embodiments thereof, it is to be understood that the present invention is by no means limited thereto and encompasses all changes and modifications which will become possible without departing from the spirit and scope of the present invention.

What is claimed is:

1. An image processing device comprising:
a setting unit setting a color material curbing mode that curbs an amount of color material in an image forming device that carries out color reproduction using a plurality of color materials;
a color information inputting unit that inputs input color information;
a converting unit that, when the color material curbing mode is set by the setting unit, converts the input color information inputted by the color information inputting unit into output color information in a color material curbing region on the basis of correspondence relationships that are set in advance such that a region that is color-reproducible by the image forming device is kept within the color material curbing region that is narrowed such that an amount of the color material is curbed, the output color information is expressed in a third color space that expresses a combination of color elements corresponding respectively to the plurality of color materials;
a total amount limit value setting unit designating a total amount limit value that limits a total sum of respective color elements in the third color space, wherein the narrowed color material curbing region is a color-reproducible region satisfying a condition for limiting in accordance with the total amount limit value designated by the total amount limit value setting unit, and wherein the total amount limit value setting unit designates a greater total amount limit value for a natural image than for a graphic image;
a limit value setting unit designating an arbitrary maximum gradation limit value or a maximum gradation value condition relating to a maximum gradation limit value; and
a boundary generating unit generating a boundary point group structuring a color gamut boundary in the third color space:
a total amount limit boundary point generating unit that, on the basis of the total amount limit value designated at the total amount limit value setting unit, changes the boundary point group generated at the boundary generating unit, wherein:

the narrowed color material curbing region is a color-reproducible region satisfying a condition for limiting in accordance with the maximum gradation limit value designated by the limit value setting unit, or in accordance with the maximum gradation limit value based on the maximum gradation value condition, wherein the maximum gradation limit value is set greater for a graphic image than for a natural image, the changing of the boundary point group sets the sum of all toner values to be less than or equal to the toner total amount limit value by fixing a toner value of one color and maintaining a constant ratio of toner values of the remaining colors to each other.

2. The image processing device of claim 1, wherein:

the input color information is expressed in a first color space that is dependent on a predetermined device;

the correspondence relationships are such that relationships of correspondence are prescribed between colors in an input region, which is in a second color space not device dependent and that includes a region that is color-reproducible by the predetermined device, and colors in a color material curbing region that is a region in the second color space that is color-reproducible by the image forming device narrowed such that the amount of the color material is curbed; and the converting unit is structured by a first color space converting unit converting the input color information into first color information expressed in the second color space, and a color converting unit that, on the basis of the correspondence relationships, converts the first color information converted by the first color space converting unit into second color information expressed in the color material curbing region, and a second color space converting unit converting the second color information converted by the color converting unit into the output color information.

3. The image processing device of claim 2, wherein, when the image expressed by the inputted input color information is a graphic image, the total amount limit value setting unit designates the total amount limit value to become smaller than the total amount limit value applied to a case that the image expressed by the inputted input color information is not a graphic image.

4. The image processing device of claim 2, further comprising:

a boundary point group color converting unit converting from the boundary point group in the third color space that has been changed at the total amount limit boundary point generating unit to a boundary point group in the second color space; and a color material curbing region generating unit generating the color material curbing region on the basis of the boundary point group in the second color space converted by the boundary point group color converting unit.

5. The image processing device of claim 4, further comprising a limit value setting unit designating, in the third color space, an arbitrary maximum gradation limit value or a maximum gradation value condition relating to a maximum gradation limit value, wherein the boundary generating unit generates a boundary point group structuring a color gamut boundary that is in the third color space and that satisfies a condition for limiting in accordance with the maximum gradation limit value designated at the limit value setting unit or the maximum gradation limit value based on the maximum gradation value condition.

6. The image processing device of claim 2, wherein the narrowed color material curbing region is a color-reproducible region that geometrically narrows a usual color gamut in the second color space.

7. The image processing device of claim 6, wherein the narrowed color material curbing region is a color-reproducible region narrowed by moving in a low chroma direction boundary positions of the usual color gamut in the second color space.

8. The image processing device of claim 6, wherein the narrowed color material curbing region is a color-reproducible region narrowed by moving toward a specific point boundary positions of the usual color gamut in the second color space.

9. The image processing device of claim 8, wherein the specific point is a white point.

10. The image processing device of claim 8, wherein the specific point is set in accordance with hue.

11. The image processing device of claim 6, wherein the narrowed color material curbing region is a color-reproducible region that narrows the usual color gamut in the second color space by moving a maximum chroma point of each hue in the usual color gamut toward a point whose lightness is higher than the maximum chroma point and that is at an inner side of the usual color gamut.

12. The image processing device of claim 6, wherein the narrowed color material curbing region is a color-reproducible region that narrows the usual color gamut in the second color space by moving in a low chroma direction a region where chroma is higher than a specific point of the usual color gamut, but does not change a region from white to the specific point of each hue of the usual color gamut.

13. The image processing device of claim 6, wherein the narrowed color material curbing region is a color-reproducible region that narrows the usual color gamut in the second color space by moving in a low chroma direction a region where chroma is higher than a specific point of the usual color gamut, but does not change a region from black to the specific point of each hue of the usual color gamut.

14. The image processing device of claim 6, wherein the narrowed color material curbing region is a common region that is common to a region for narrowing and to the usual color gamut in the second color space.

15. The image processing device of claim 14, wherein the region for narrowing is a region that shifts the usual color gamut in any one of: a high lightness direction; a low chroma direction; and a high lightness and low chroma direction.

16. The image processing device of claim 1, wherein the maximum gradation limit value designated at the limit value setting unit, or the maximum gradation limit value, which is based on the maximum gradation value condition, is a maximum gradation value of a color of a color material that has little effect on an image that is color-reproduced by the image forming device.

17. The image processing device of claim 1, wherein the limit value setting unit designates the maximum gradation limit value or the maximum gradation value condition in accordance with a combination of respective color elements of the third color space.

18. The image processing device of claim 16, wherein the limit value setting unit designates the maximum gradation limit value, or the maximum gradation value condition, for a region including a specific color reproduced by the color material.

19. The image processing device of claim 1 wherein the limit value setting unit designates the maximum gradation limit value or the maximum gradation value condition in accordance with a type of an image expressed by the inputted input color information.

20. The image processing device of claim 19, wherein, when the image expressed by the inputted input color information is a natural image, the limit value setting unit designates the maximum gradation limit value or the maximum gradation value condition such that the maximum gradation limit value becomes smaller than the maximum gradation limit value applied to a case that the image expressed by the inputted input color information is not a natural image.

21. The image processing device of claim 1, further comprising:
- a boundary generating unit generating a boundary point group structuring a color gamut boundary that is in the third color space and that satisfies the condition for limiting in accordance with the maximum gradation limit value designated at the limit value setting unit or the maximum gradation limit value based on the maximum gradation value condition;
- a boundary point group color converting unit converting from the boundary point group in the third color space to a boundary point group in the second color space; and
- a color material curbing region generating unit generating the color material curbing region on the basis of the boundary point group in the second color space converted by the boundary point group color converting unit.

22. The image processing device of claim 1, further comprising the image forming device,
wherein the image forming device forms an image on a recording sheet by using the plurality of color materials, on the basis of the output color information converted by the converting unit.

23. An image processing method comprising:
setting a color material curbing mode that curbs an amount of color material in an image forming device that carries out color reproduction using a plurality of color materials;
inputting input color information; and
when the color material curbing mode is set, converting the inputted input color information into output color information in a color material curbing region on the basis of correspondence relationships set in advance such that a region that is color-reproducible by the image forming device is kept within the color material curbing region narrowed such that an amount of the color material is curbed, the output color information is expressed in a color space that expresses a combination of color elements corresponding respectively to the plurality of color materials; and a total amount limit value setting unit designating a total amount limit value that limits a total sum of respective color elements in a third color space, wherein the narrowed color material curbing region is a color-reproducible region satisfying a condition for limiting in accordance with the total amount limit value designated by the total amount limit value setting unit, and wherein the total amount limit value setting unit designates a greater total amount limit value for a natural image than for a graphic image; and
generating a boundary point group structuring a color gamut boundary in the third color space;
changing the boundary point group on the basis of the total amount limit value designated at the total amount limit value setting unit;
the changing of the boundary point group sets the sum of all toner values to be less than or equal to the toner total amount limit value by fixing a toner value of one color and maintaining a constant ratio of toner values of the remaining colors to each other; and
designating an arbitrary maximum gradation limit value or a maximum gradation value condition relating to a maximum gradation limit value, wherein:
the narrowed color material curbing region is a color-reproducible region satisfying a condition for limiting in accordance with the maximum gradation limit value designated by the limit value setting unit, or in accordance with the maximum gradation limit value based on the maximum gradation value condition, wherein the maximum gradation limit value is set greater for a graphic image than for a natural image.

* * * * *